United States Patent [19]
Fleming

[11] Patent Number: 6,073,188
[45] Date of Patent: Jun. 6, 2000

[54] ELECTRONIC SWITCHBOX FOR SELECTION AND SHARING OF INTERNAL PERIPHERAL DEVICES AMONG DIFFERENT COMPUTERS, THE INTERNAL PERIPHERAL DEVICES LOCATED IN SLOTS OF A CHASSIS

[75] Inventor: Scott M. Fleming, Harris County, Tex.

[73] Assignee: Compaq Computer Corporation, Houston, Tex.

[21] Appl. No.: 08/900,676

[22] Filed: Jul. 25, 1997

[51] Int. Cl.$^7$ .............................. G06F 13/10; G06F 13/14
[52] U.S. Cl. ................................. 710/38; 710/8; 710/131; 711/147; 711/148
[58] Field of Search ...................................... 395/858, 821, 395/828, 500, 311; 711/147, 148; 710/38, 1, 8, 131

[56] References Cited

U.S. PATENT DOCUMENTS

| | | | |
|---|---|---|---|
| 4,608,663 | 8/1986 | Gordon | 364/900 |
| 5,307,462 | 4/1994 | Hastings | 395/275 |
| 5,363,484 | 11/1994 | Desnoyers et al. | 395/200 |
| 5,621,899 | 4/1997 | Gafford et al. | 395/299 |
| 5,630,153 | 5/1997 | Intrater et al. | 395/800 |
| 5,638,521 | 6/1997 | Buchala et al. | 395/311 |
| 5,680,536 | 10/1997 | Tyuluman | 395/180 |
| 5,717,950 | 2/1998 | Yamaguchi et al. | 395/828 |

FOREIGN PATENT DOCUMENTS

406149718A  5/1994  Japan .............................. G06F 13/14

*Primary Examiner*—Thomas C. Lee
*Assistant Examiner*—Rehana Perveen
*Attorney, Agent, or Firm*—Akin, Gump, Strauss, Hauer & Feld, L.L.P.

[57] ABSTRACT

An electronic switchbox for coupling at least one internal peripheral device to any one of a plurality of computer systems. The electronic switchbox includes at least one peripheral connector for receiving and electrically coupling to an internal peripheral device, a plurality of computer connectors, each for coupling to one of the plurality of computer systems, and a selection device that selectively couples the peripheral connector to any one of the plurality of computer connectors. In this manner, at least one internal peripheral device is selectively coupled to, and thus effectively shared between, any one of the computer systems. The switchbox preferably includes a chassis with at least one slot, where the peripheral connector is mounted to the slot for receiving and electrically coupling to the internal peripheral device when plugged into the slot. More preferably, the chassis includes a plurality of slots each with a corresponding peripheral connector, so that multiple internal peripheral devices are shared by the computer systems.

20 Claims, 5 Drawing Sheets

ELECTRONIC SWITCHBOX FOR SELECTION AND SHARING OF INTERNAL PERIPHERAL DEVICES AMONG DIFFERENT COMPUTERS, THE INTERNAL PERIPHERAL DEVICES LOCATED IN SLOTS OF A CHASSIS

FIELD OF THE INVENTION

The present invention relates to computer peripheral devices, and more particularly to an electronic switchbox that connects one or more internal peripheral devices to any one of several computer systems.

DESCRIPTION OF THE RELATED ART

In many companies and/or private organizations, a relatively large number of people require the capabilities and services of a network system, such as a local area network (LAN), a wide area network (WAN), etc. Although a small LAN may need only a single computer server to enable sharing of resources, larger LANs and WANs usually have many servers coupled to the network to handle the demands of a larger group of people. The server systems are usually located together in a computer room for convenient access by a system operator or administrator, who maintains, updates and services the computer systems. Each computer may be equipped with external peripheral devices, such as a keyboard, mouse and monitor. Each computer may be implemented as a separate system coupled to a network with a network interface card (NIC) or the like. Alternatively, some or all of the server computers are mounted in corresponding slots of one or more racks in a rack-mounted configuration.

Regardless of the particular configuration, each computer system usually includes one or more internal peripheral devices, such as a floppy drive and a hard disk drive, and may even include further internal peripherals such as a CD ROM drive, a backup tape drive, etc. Once the computer system is in operation, many of the internal peripheral devices are seldom used or not used at all. The hard drive, CD ROM drive and the floppy drive may be used occasionally. The drives may be necessary to load software at the initial configuration of the network and periodically thereafter. Most of the time, however, the internal peripheral devices are not necessary and remain idle. This results in a rather inefficient use of many or most of the peripheral devices of each computer system. The problem is multiplied for particularly large networks that require many computer systems.

It is desired to provide a way to more efficiently utilize the internal peripheral devices of a computer system, particularly the internal peripheral devices of multiple computer systems located together or within close proximity.

SUMMARY OF THE INVENTION

An electronic switchbox according to the present invention couples at least one internal peripheral device to any one of a plurality of computer systems. The electronic switchbox includes at least one peripheral connector for receiving and electrically coupling to an internal peripheral device, a plurality of computer connectors, each for coupling to one of the plurality of computer systems, and a selection device that selectively couples the peripheral connector to any one of the plurality of computer connectors. In this manner, at least one internal peripheral device is selectively coupled to, and thus effectively shared among, any one of the computer systems. The switchbox includes a chassis with at least one slot, where the peripheral connector is mounted to the slot for receiving and electrically coupling to the internal peripheral device when plugged into the slot. Thus, the chassis may include a plurality of slots, each with a corresponding peripheral connector, so that multiple internal peripheral devices are shared.

In one embodiment, a peripheral bus is coupled to each of the peripheral connectors, where the selection device selectively couples the peripheral bus to one of the computer systems. The peripheral bus may be implemented according to any one of several disk drive implementations, such as the Integrated Drive Electronics (IDE), the AT Attachment (ATA) or ATA-2 or ATA-3, the enhanced-IDE (EIDE), the ATA Packet Interface (ATAPI), the Small Computer System Interface (SCSI) bus, the PCMCIA or PC CARD interface, etc. The selection device may be implemented in any suitable fashion, such as a switch device and select logic coupled to the switch device and to the peripheral connectors. The switch device may comprise several buttons or a turnable knob, and the select logic may be implemented using discrete or integrated multiplexors or the like.

In another embodiment, the switchbox operates as a common mode device where all attached computer systems access the peripheral devices in the switchbox in a first-come, first served or simultaneous manner. Any priority scheme may be used to enable sharing of the peripheral devices.

The electronic switchbox may further include a universal serial bus (USB) or the like, which is also coupled to the selection device. A USB preferably includes a USB hub, which is particularly convenient for connecting external peripheral devices, such as a mouse, a keyboard, an electronic pen, a monitor, speakers, a printer, a joystick, etc. In a simpler embodiment, a keyboard interface is provided for sharing a keyboard, so that switching of computer systems occurs via keystrokes on the keyboard. Also, the electronic switchbox may include a power supply for providing power to the internal peripheral devices and the selection device, if desired. The internal peripheral devices may all be of the same type. However, two or more different types of internal peripheral devices are also contemplated. If so, the electronic switchbox may further include at least one first type of peripheral connector implemented according to a first peripheral standard, and at least one second type of peripheral connector implemented according to a second peripheral standard, where the selection device selectively couples each of the first and second types of peripheral connectors to any one of the computer connectors and thus to a selected computer.

Suitable cables may be used for coupling each of the computer systems to the electronic switchbox. A single cable may be implemented, or several cables may be coupled between each computer and computer connector. For example, each cable may include a SCSI cable and a USB cable for coupling internal and external peripheral devices, respectively. The cables include the necessary conductors to enabling communication with one or more peripheral buses. In this manner, the selected computer is coupled to all of the internal and external peripheral devices provided in the electronic switchbox.

It is now appreciated that an electronic switchbox according to the present invention enables two or more computer systems to share one or more internal peripheral devices as well as external peripheral devices as desired. The present invention alleviates the need to purchase separate peripheral devices for the computer systems, and thus increases usage and efficiency of the overall system. The present invention is particularly advantageous for several server computers that do not necessarily require dedicated internal peripheral devices at all times. When it is desired to modify and/or upgrade a server system, an administrator or operator simply manipulates a switch device to select the server system, which couples all of the peripheral devices to that system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

An electronic switchbox according to the present invention enables two or more computer systems to share external peripheral devices, such as a keyboard, mouse, a joystick and a printer, as well as internal devices, such as hard disk drives, CD-ROMs, floppy drives, etc. The switchbox is particularly advantageous for a group of computers coupled to one or more LAN(s) or WAN(s). The server computer systems are usually located together in one computer room for convenient access. Since a system administrator can usually only operate one computer system at a time, the switchbox enables the administrator to use a single set of external peripheral devices to operate any of the computer systems. Alternatively, the switchbox may be configured to enable simultaneous access of the peripheral devices.

Figure 1A:
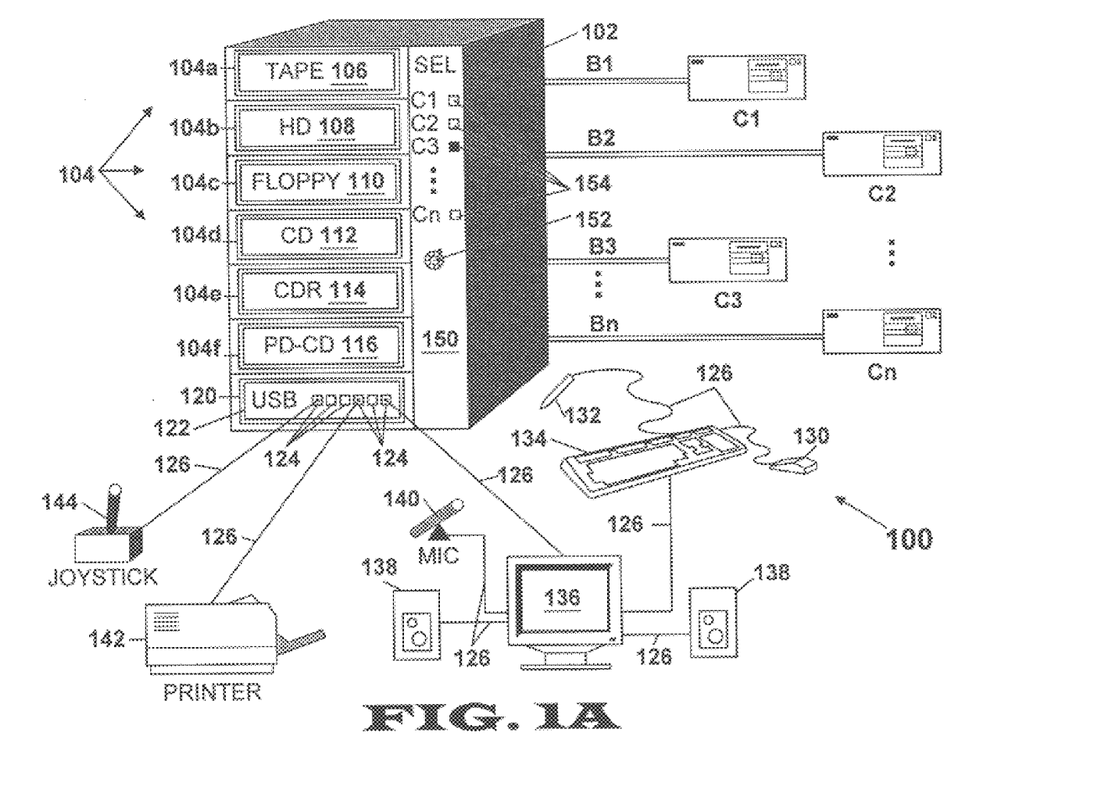
FIG. 1A is a perspective block diagram of a system including an electronic switchbox implemented according to the present invention.

Referring now to FIG. 1A, a perspective block diagram is shown of a system 100 including an electronic switchbox 102 implemented according to the present invention. The system 100 includes a plurality of computer systems C1, C2, C3, . . . Cn, each coupled to the electronic switchbox 102 via a corresponding cable B1, B2, B3, . . . Bn, respectively, as further described below. The number "n" is any integer number representing that any number of computers systems and corresponding cables may be included as desired, including two (2), three (3), four (4), five (5), etc. The computer systems C1–Cn may be separate and independent or may be related in any desired manner. For example, the computer systems C1–Cn could be servers systems for one or more LANs or WANs (not shown) and proximately located for convenient access by a system administrator.

The electronic switchbox 102 includes a chassis with one or more slots 104, each configured to receive any one of a plurality of different types of internal peripheral devices. The word "internal" generally refers to devices that are mounted entirely within the outer case of a computer system, or that are mounted externally but electrically interfaced to an internal connector or logic of the computer system. As shown in FIG. 1A, a tape drive 106 is plugged into a slot 104a, a hard disk drive (HD) 108 is plugged into a slot 104b, a floppy disk drive 110 is plugged into a slot 104c, a CD-ROM drive (CD) 112 is plugged into a slot 104d, a CD-Recorder (CDR) 114 is plugged into a slot 104e and a Power Drive CD-ROM (PD-CD) 116 is plugged into a slot 104f. The particular types of internal devices shown are included for illustration of the present invention, and many other types of internal peripheral devices are contemplated and may be included as well. Also, although six (6) slots are shown, any number of slots may be included as desired. A single slot 104 is contemplated up to as many slots 104 as necessary to couple as many internal peripheral devices as desired. The peripheral devices may be of any type and may include more than one of any particular type. For example, two or more hard disk drives, floppy disk drives, CD-ROMs, etc., may be plugged into respective slots 104.

An optional slot 120 is included in the electronic switchbox 102 for receiving an optional Universal Serial Bus (USB) hub 122, which includes one or more USB ports 124 adapted to receive corresponding USB cables 126. Alternatively, the USB hub 126 is built into the chassis of the electronic switchbox 102. The USB hub 126 enables one or more external peripheral devices to be coupled to the electronic switchbox 102, such as a mouse 130, an electronic pen 132, a keyboard 134, a monitor 136, speakers 138, a microphone 140, a printer 142, a joystick 144, etc. In the embodiment shown, each of the external peripheral devices support the USB standard, where the mouse 130 and the pen 132 are coupled to the keyboard 134 via corresponding USB cables 126. The keyboard 134, the speakers 138 and the microphone 140 are coupled to the monitor 136 via USB cables 126, and the monitor 136 is coupled to a USB port 124 of the USB hub 122. The printer 142 and the joystick 144 are each coupled to corresponding USB ports 124 via USB cables 126. Of course, each of the external peripheral devices may be individually connected to the USB hub 122 via respective USB cables 126 and ports 124 as desired. The USB hub 122 provides a convenient format for connecting a plurality of serial or parallel external peripheral devices to the electronic switchbox 102.

The electronic switchbox 102 includes a selection (SEL) device 150, that further includes a switch device and select logic for selecting any one of the computer systems C1–Cn. The selection device 150 may be implemented in any desired fashion, and may include any type of electrical, mechanical or electromechanical means for performing the selecting and switching functions. For example, a mechanical dial 152 may be included and turned to any one of n discrete positions, each for selecting a corresponding one of the computer systems C1–Cn. Corresponding selection indicators 154 appropriately labeled provide an indication of which computer system is selected. The selection indicators 154 may include a light source or the like, which is turned on or otherwise activated to indicate the selected computer system. As shown in FIG. 1A, for example, the selection indicator 154 for the computer system C3 is activated, indicating that the computer system C3 is selected. Alternatively, the dial 152 is omitted and each of the selection indicators 154 are configured to include a mechanical button or the like to perform the selection function. A system administrator pushes one of the buttons 154, which includes a light indicating that the corresponding computer system is selected. Of course, other selection mechanisms may be used in combination or in the alternative for performing the selection function.

According to the present invention and as further described below, the electronic switchbox 102 operates to couple the selected one of the computer systems C1–Cn to any one or more of the internal peripheral devices 106–116 and the USB hub 122 via the corresponding one of the cables B1–Bn. The USB hub 122 further couples the external peripheral devices 130–144 to the selected computer system via the selected bus. In this manner, the computer systems C1–Cn effectively share the internal and external peripheral devices 106–116 and 130–144, although only the selected computer system accesses the peripheral devices at any given time. As shown in FIG. 1A, for example, if the computer system C3 is selected, the tape drive 106, the hard disk drive 108, the floppy disk drive 110, the CD-ROM 112, the CD-Recorder 114, the Power Drive CD-ROM 116, the mouse 130, the electronic pen 132, the keyboard 134, the monitor 136, the speakers 138, the microphone 140, the printer 142 and the joystick 144 are all coupled to the computer system C3. After the system administrator is finished accessing the computer system C3, the administrator simply uses the selection device 150 to select another computer system as desired.

Figure 2A:
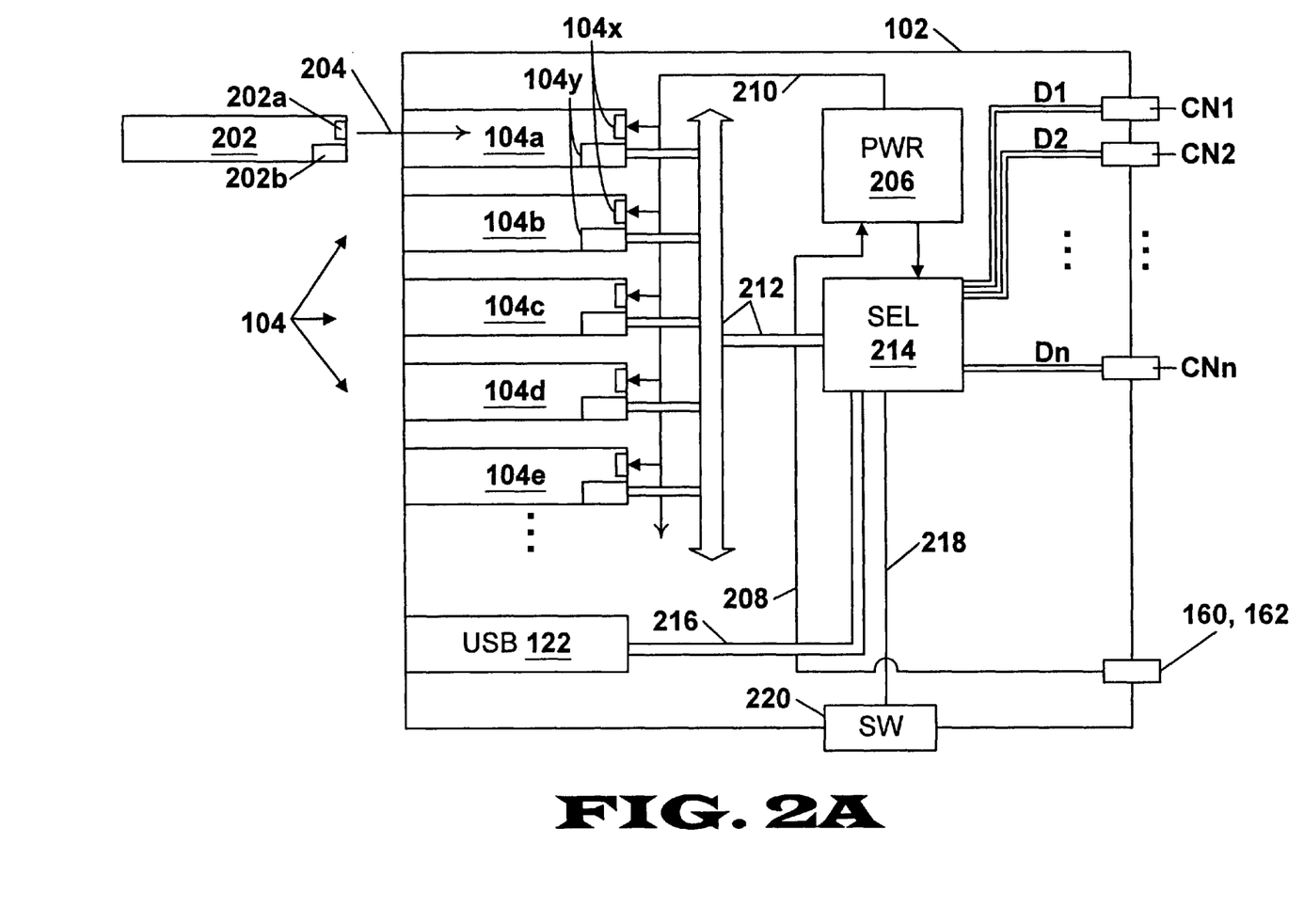
FIG. 2A is a more detailed block diagram of the electronic switchbox of FIG. 1A.

As described more fully below, each of the cables B1–Bn are configured to provide the necessary connectivity of the internal peripheral devices to the selected computer system. In one embodiment, the internal peripheral devices 106–116 are coupled together via a common external peripheral bus, such as a small computer system interface (SCSI) bus, or any bus compatible with any known type of disk drive implementation, such as Integrated Drive Electronics (IDE), AT Attachment (ATA) or ATA-2 or ATA-3, enhancedIDE (EIDE), ATA Packet Interface (ATAPI), etc. The USB 122 couples any of the connected external peripheral devices 130–144 to a common USB cable 216 (FIG. 2). Each of the cables B1–Bn includes the necessary conductors and cables to couple all of the internal peripheral devices 106–116 and the USB hub 122. As described more fully below, switch and select logic is provided for coupling a common external peripheral bus and a common USB cable 216 to any one of the cables B1–Bn for providing the connectivity to the selected computer system.

Figure 1B:
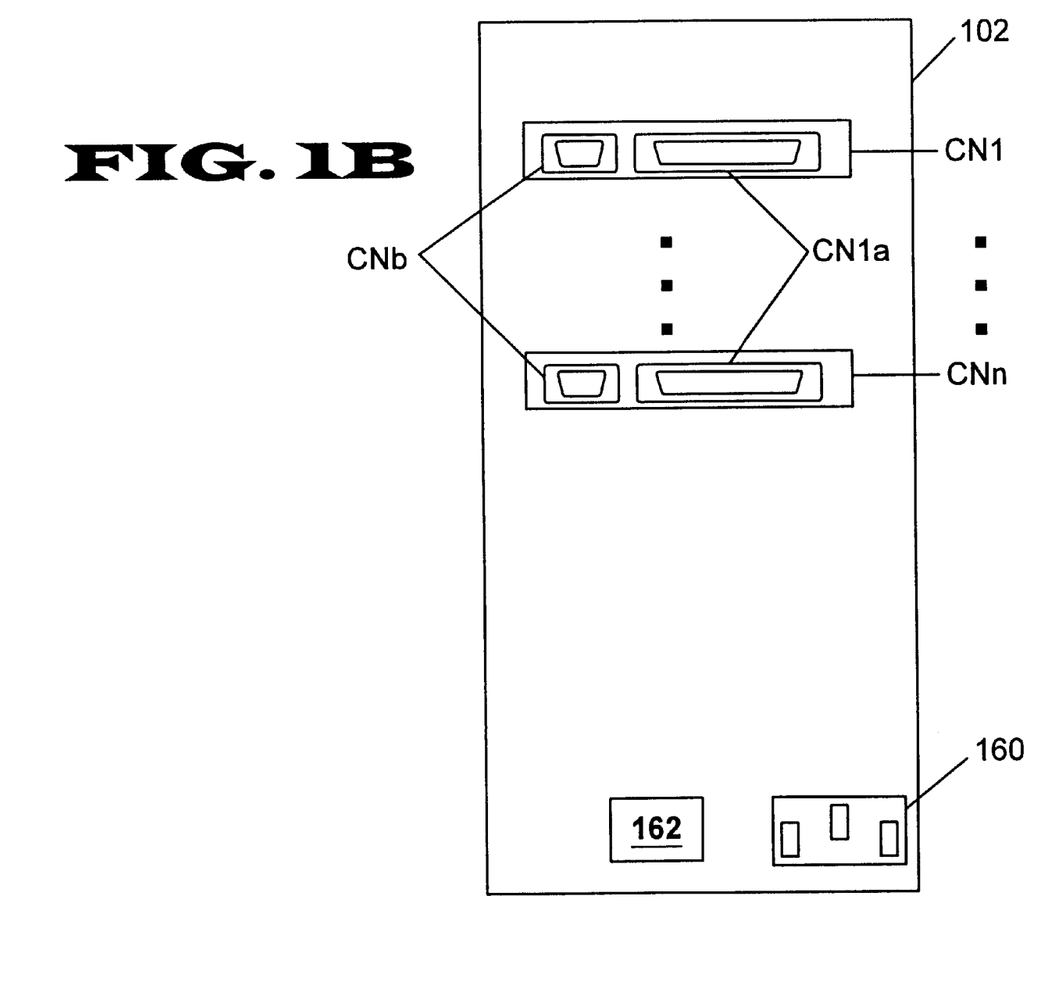
FIG. 1B is a diagram of the back side of the electronic switchbox of FIG. 1 illustrating an exemplary embodiment of a connection configuration for connecting the computer systems of FIG. 1A.

FIG. 1B is a diagram of the back side of the electronic switchbox 102 illustrating one embodiment of a connection configuration for connecting the computer systems C1–Cn. A plurality of connectors CN1, . . . , CNn are shown, each for interfacing a corresponding one of the cables B1–Bn, where again, n is any desired integer equal to two or more depending upon the number of computer systems C1–Cn. The connectors CN1–CNn are configured to mate with a compatible connector (not shown) provided on each of the cables B1–Bn, where the other ends of the cables B1–Bn include complementary connectors for interfacing one or more compatible connectors on each of the computer systems C1–Cn. In the preferred embodiment, the electronic switchbox 102 also includes an AC receptacle 160 for receiving and connecting AC power. In one embodiment, an internal power supply converts AC power to regulated power required by each of the internal peripheral devices 106–116 and the USB hub 122. Alternatively, or in addition, a DC power input connector 162 is provided which receives regulated DC voltages from an external power supply (not shown), and which distributes the regulated power to the internal peripheral devices 106–116 and the USB hub 122.

The connectors CN1–CNn may be implemented as a single connector or as a combination of connectors. As shown in FIG. 1B, each of the connectors CN1–CNn includes a first connector CNa for coupling the internal peripheral devices 106–116 and a second connector CNb for coupling the external peripheral devices 130–144. For example, the connector CNa may be a SCSI connector, such as a 68-pin Centronics connector or the like for connecting together one or more SCSI-2 devices. The connector CNb may be a 4-pin USB connector for interfacing a compatible USB connector. In this case, the cables B1–Bn each comprise two separate cables with corresponding connectors, such as a SCSI-2 twisted-wire pair cable with Centronics connectors and a USB cable with USB connectors. Alternatively, the connectors CN1–CNn may each be a single 72-pin connector combining the functions of SCSI and USB, where the cables B1–Bn each comprise 72-pin connectors and 72 conductor cables. These exemplary embodiments are provided for example and are not intended to limit the present invention to any particular types of cables and connectors, since any type of suitable connector and cable configuration or combinations thereof are contemplated. For example, compatible ATA-x, ATAPI, IDE, EIDE, etc. connections are contemplated.

Referring now to FIG. 2A, a more detailed block diagram is shown of the electronic switchbox 102. As shown, one or more slots 104 are provided to externally receive and electrically interface any one of the internal peripheral devices previously described. For example, an exemplary internal peripheral device 202 is shown, which is plugged into a slot 104a as shown by an arrow 204. The exemplary internal peripheral device 202 represents any of the internal peripheral devices 106–116 shown in FIG. 1A. The device 202 preferably includes a power connector 202a and a signal connector 202b. Each slot 104 includes a power connector 104x and a signal connector 104y, which are configured to electrically and mechanically interface the power connector 202a and the signal connector 202b, respectively, of the internal peripheral device 202 when plugged into any one of the slots 104. In one embodiment, an AC to DC power supply 206 receives AC power from the AC receptacle 160 via conductors 208, and provides regulated power via power lines 210 to each of the power connectors 104x of each of the slots 104. Alternatively, an external power supply (not shown) provides regulated power to the DC power input connector 162, where the power supply 206 distributes or otherwise couple regulated power from the conductors 208 to the connectors 104x via the power lines 210. In either case, the exemplary internal peripheral device 202 receives power when plugged into any one of the slots 104 via the connectors 104x, 202a.

Each of the signal connectors 104y are coupled to a common bus 212, which is coupled to select logic 214. In this manner, the signal connector 202b of the peripheral device 202 is coupled to the bus 212 and to the select logic 214 when plugged into any one of the slots 104. The select logic 214 is also coupled to the USB hub 122, if included, via a USB cable 216 or the like. The select logic 214 receives power, if necessary, from the power supply 206, and is connected to a switch device 220 via one or more signal conductors 218. The select logic 214 is also coupled to each of the connectors CN1–CNn via corresponding buses D1, D2, . . . , Dn. The buses D1–Dn include all the necessary conductors for combining the signals of the common bus 212 and the USB cable 216. In this manner, the switch device 220 causes the select logic 214 to select one of the computer systems C1–Cn. The select logic 214 couples any internal peripheral devices plugged into the slots 104 and external peripheral devices coupled to the USB hub 122 to the selected computer system via the corresponding one of the buses D1–Dn and connectors CN1–CNn. The select logic 214 is implemented in any suitable manner for connecting all of the signals to one of the computer systems C1–Cn, such as, for example, discrete or integrated multiplexors or the like. Discrete or integrated logic including CMOS, bipolar or MOSFET switching transistors are also contemplated for implementing the select functions of the select logic 214. Alternatively, the switch device 220 and the select logic 214 may comprise a suitable electromechanical switch device or the like.

The system administrator couples two or more computer systems C1–Cn to the electronic switchbox 102 via corresponding cables B1–Bn and connectors CN1–CNn. The system administrator also plugs in one or more compatible internal peripheral devices into any one or more of the slots 104, such as any one or more of the internal peripheral devices 106–116 shown in FIG. 1, or any other type of internal peripheral device known to those skilled in the art. If the USB hub 122 is included, the system administrator also couples any one or more of the external peripheral devices 130–144 or any other type of external peripheral devices to the USB hub 122. The system administrator then manipulates the switch device 220 to select any one of the coupled computer systems C1–Cn, which couples the included internal and external peripheral devices to the selected computer system.

In this manner, the computer systems C1–Cn share both the external and internal peripheral devices plugged into the electronic switchbox 102. The electronic switchbox 102 provides more efficient use of the peripheral devices and avoids extraneous and unnecessary devices and cost. In particular, none of the computers systems C1–Cn need to include separate peripheral devices, since they are provided using the electronic switchbox 102. Thus, only one of each of the peripheral devices necessary for desired operation of all of the computer systems C1–Cn need be purchased and plugged into the electronic switchbox 102.

The computer systems C1–Cn are booted up and operated in any one of several ways. The system administrator connects as many computer systems as needed to the electronic switchbox 102 and then selects and boots each computer system one by one until all are booted and operating normally. For example, the administrator selects the computer system C1 to couple all of the included internal peripheral devices including the hard disk drive 108 to the computer system C1. Then, the computer system C1 is booted using the hard disk drive 108. The administrator repeats this process for each computer system C2–Cn to be used. The select logic 214 includes logic and circuitry to simulate the identification and presence of any one or more of its peripheral devices to the booted computer system. The booted computer system "acts" as if the one or more peripheral devices were wholly and exclusively part of itself even though physically located in the electronic switchbox 102.

Alternatively, each of the computer systems C1–Cn are booted independently of the electronic switchbox 102. However, this may require a dedicated floppy or hard disk drive for each computer system C1–Cn. The computer systems C1–Cn may also be "fooled" into detecting any one or more of the desired external peripheral devices, such as the keyboard 134, the mouse 130, the printer 142, etc. even if not coupled and/or selected. Each of the computer systems C1–Cn includes the desired software and drivers for each of the external peripheral devices 130–144 and internal peripheral devices 106–116 that are to be coupled through the electronic switchbox 102.

Figure 2B:
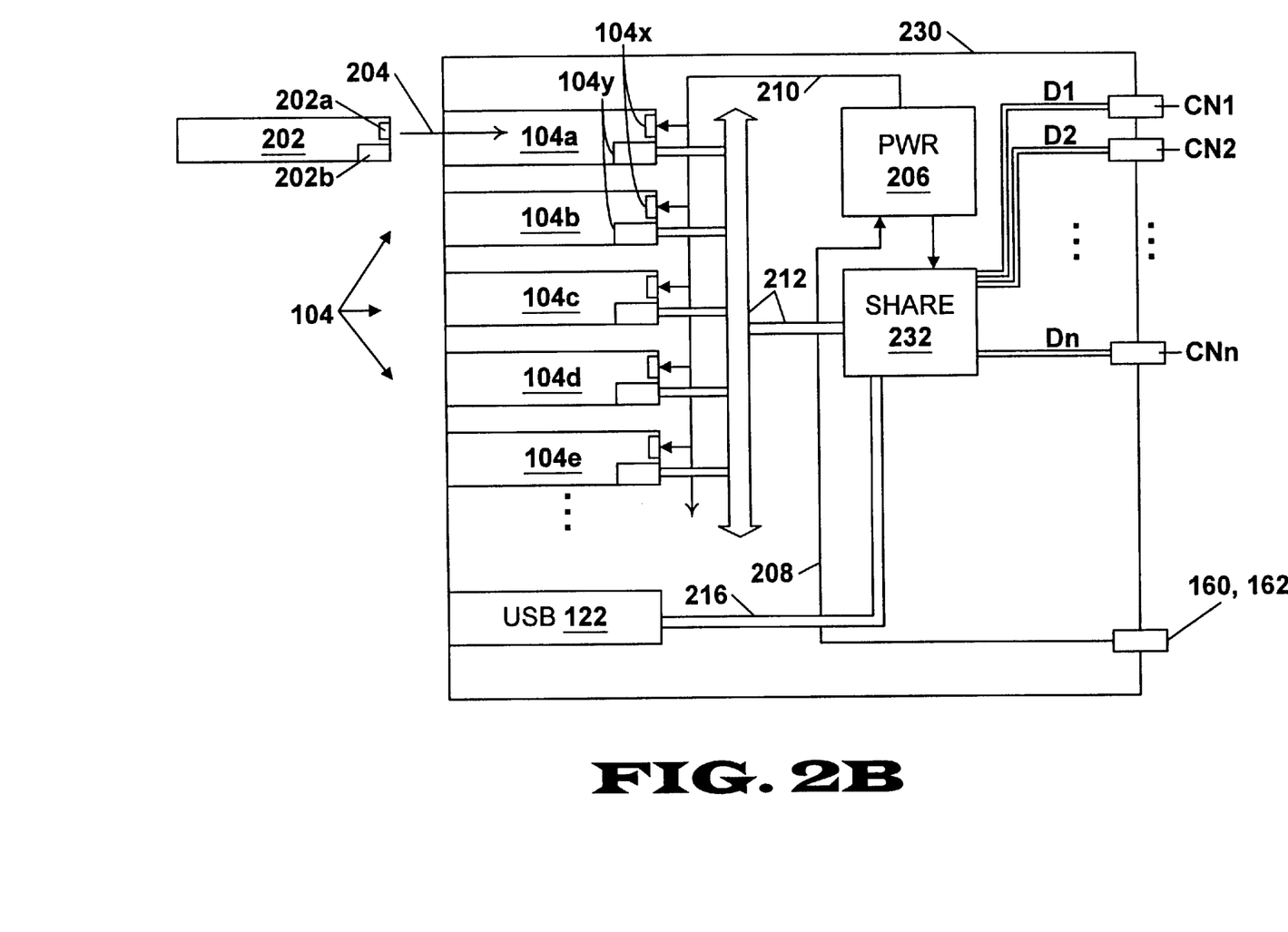
FIG. 2B is a block diagram of an alternative electronic switchbox for simultaneously sharing the peripheral devices.

FIG. 2B illustrates an alternative embodiment of the electronic switchbox 102, referred to as the electronic switchbox 230, which is similar to the electronic switchbox 102 but allows simultaneous sharing of the peripheral devices. The select logic 214 is replaced by share logic 232, and the signal conductors 218 and switch device 220 are not needed. The share logic 232 couples any internal peripheral devices plugged into the slots 104 and external peripheral devices coupled to the USB hub 122 to the selected computer system via the corresponding one of the buses D1–Dn and connectors CN1–CNn in a similar manner. However, the share logic 232 operates as a cross switch device or the like that automatically detects access requests via the buses D1–Dn and connectors CN1–CNn and connects the requesting computer system Cl-Cn to the requested device. The share logic 232 arbitrates for access to the common bus 212 on a first-come, first-served (FCFS) basis, round-robin basis or the like. The share logic 232 may also allow two different computer systems to access two different peripheral devices simultaneously. The share logic 232 arbitrates access between two or more computer systems Cn attempting to access the same peripheral device at the same time.

Figure 3:
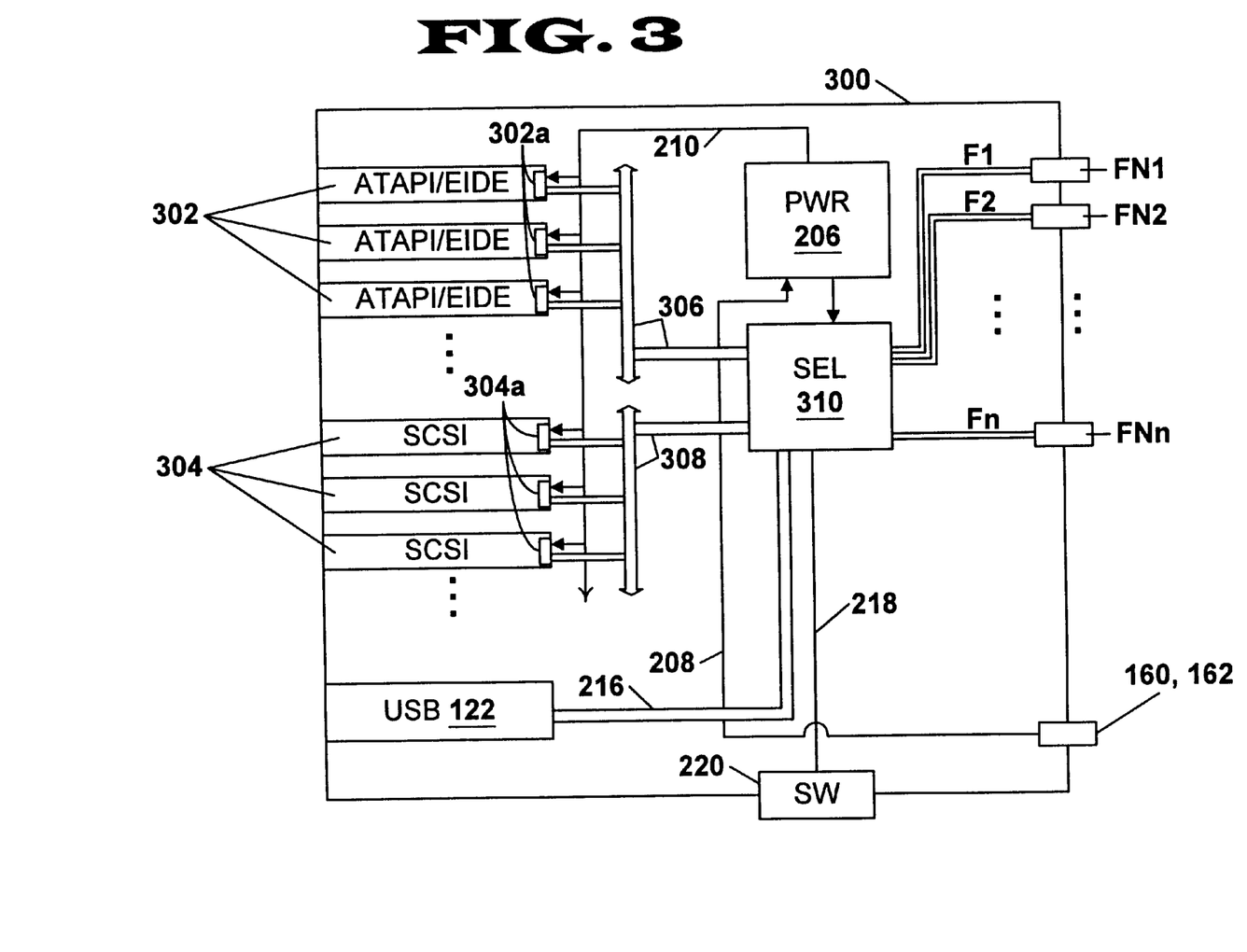
FIG. 3 is a block diagram of another alternative electronic switchbox implemented according to the present invention.

Referring now to FIG. 3, a block diagram is shown of another exemplary electronic switchbox 300 implemented according to the present invention. Similar components and/or devices assume identical reference numerals as that for the electronic switchbox 102. The electronic switchbox 300 is similar to the electronic switchbox 102 and includes the switch device 220, either or both of the AC receptacle 160 and the DC power input connector 162, the USB hub 122, the power supply 206 and the USB cable 216. The electronic switchbox 300, however, preferably includes a chassis with one or more each of at least two different types of slots 302 and 304, each slot configured to receive a corresponding and compatible type of internal peripheral device. The computer systems C1–Cn are coupled to the electronic switchbox 300 in a similar manner as described above for the electronic switchbox 102.

Each of the slots 302 include a combined power and signal connector 302a and each of the slots 304 include a combined power and signal connector 304a. The combined connectors 302a are similar to the connectors 104x and 104y except including both power and signal functionality using one connector scheme. Internal peripheral devices plugged into any one of the slots 302 or 304 each include compatible connectors (not shown) for interfacing the connectors 302a or 304a, respectively. The power lines 210 provide power via the connectors 302a and 304a in a similar manner as described above. The signal lines (not shown) of the internal peripheral devices are coupled to corresponding common buses 306 or 308, respectively, when plugged into one of the respective slots 302 or 304. Select logic 310 is coupled to the switch device 220, to both of the common buses 302, 304 and to the USB cable 216. The select logic 310 is further coupled to a plurality of buses F1, F2, . . . Fn, which are coupled to a corresponding one of a plurality of external connectors FN1, FN2, . . . FNn. The slots 302 and 304 and the corresponding buses 306 and 308, respectively, are configured according to any desired bus structure, such as ATAPI, EIDE or SCSI or the like. A SCSI bus may be implemented according to any one of the known SCSI buses, such as SCSI-1, SCSI-2, SCSI-3, etc. Of course, ATAPI slots are configured to receive ATAPI type peripheral devices, EIDE slots are configured to receive EIDE type peripheral devices and SCSI slots are configured to receive SCSI peripheral devices.

The select logic 310 is similar to the select logic 214, except that the select logic 310 couples both of the common buses 302 and 304 as well as the USB cable 216 to a selected one of the buses F1–Fn. The buses F1–Fn and the connectors FN1–FNn are similar to the buses D1–Dn and the connectors CN1–CNn previously described, except that each includes corresponding conductors and contacts for both of the common buses 302, 304 and the USB cable 216. In this manner, the select logic 310 couples all of the internal and external peripheral devices coupled to the electronic switchbox 300 to any one of the connectors FN1–FNn, and thus to a selected computer system coupled thereto. Of course, corresponding cables (not shown) which are similar to the cables B1–Bn but that include further conductors and contacts for both of the buses 302, 304 and the USB cable 216, are provided for connecting the computer systems C1–Cn to the electronic switchbox 300. The electronic switchbox 300 illustrates that a plurality of different types of internal peripheral devices may be shared among two or more computer systems.

It is now appreciated that an electronic switchbox according to the present invention enables two or more computer systems to share one or more internal peripheral devices. The present invention alleviates the need to purchase separate peripheral devices for the computer systems, and thus increases usage and efficiency of the overall system. The present invention is particularly advantageous for several server computers that do not necessarily require dedicated internal peripheral devices at all times. When it is desired to modify and/or upgrade a server system, an administrator or operator simply manipulates a switch device to select the server system, which couples all of the peripheral devices to that system.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. An electronic switchbox that couples at least one internal peripheral device to any one of a plurality of computer systems, comprising:
    a chassis including at least one slot;
    at least one peripheral connector, said at least one peripheral connector receiving and electrically coupling to a corresponding one of said at least one internal peripheral device, each of said at least one internal peripheral device mounted to a corresponding one of said at least one slot and contained within said chassis;
    a plurality of computer connectors, each for coupling to one of the plurality of computer systems; and
    a selection device that selectively couples said peripheral connector to any one of said plurality of computer connectors.

2. The electronic switchbox of claim 1, further comprising:
    a peripheral bus coupled to each of said plurality of peripheral connectors; and
    said selection device selectively coupling said peripheral bus to any one of said plurality of computer connectors.

3. The electronic switchbox of claim 2, wherein said peripheral bus is a SCSI bus.

4. The electronic switchbox of claim 2, wherein said plurality of peripheral connectors are configured to receive peripheral devices implemented according to ATAPI and wherein said peripheral bus is configured for communication according to ATAPI.

5. The electronic switchbox of claim 2, wherein said plurality of peripheral connectors are configured to receive peripheral devices implemented according to EIDE and wherein said peripheral bus is configured for communication according to EIDE.

6. The electronic switchbox of claim 1, wherein said selection device comprises:
    a switch device; and
    select logic coupled to said switch device and to said at least one peripheral connector.

7. The electronic switchbox of claim 1, wherein said selection device comprises:
    share logic coupled to said at least one peripheral connector that allows simultaneous sharing of said peripheral connector among said plurality of computer connectors.

8. The electronic switchbox of claim 1, further comprising:
    a universal serial bus hub coupled to said selection device; and
    said selection device further selectively coupling said universal serial bus hub to any one of said plurality of computer connectors.

9. The electronic switchbox of claim 1, further comprising:
    a power supply coupled to said at least one peripheral connector for providing power to a corresponding internal peripheral device.

10. The electronic switchbox of claim 1, further comprising:
    said at least one peripheral connector comprising:
        at least one first type of peripheral connector implemented according to a first peripheral standard; and
        at least one second type of peripheral connector implemented according to a second peripheral standard; and
    said selection device selectively coupling each of said first and second types of peripheral connectors to any one of said plurality of computer connectors.

11. An electronic switchbox for coupling to a plurality of computer systems for sharing peripheral devices, comprising:
    a chassis including at least one slot;
    at least one internal peripheral device, mounted to said chassis within a corresponding one of said at least one slot;
    a plurality of computer connectors, each for coupling to one of the plurality of computer systems; and
    a selection device that selectively couples said at least one internal peripheral device to any one of said plurality of computer connectors.

12. The electronic switchbox of claim 11, further comprising:
    a peripheral bus coupled to each of said plurality of internal peripheral devices; and
    said selection device selectively coupling said peripheral bus to any one of said plurality of computer connectors.

13. The electronic switchbox of claim 11, wherein said selection device comprises:
    a switch device; and
    select logic coupled to said switch device and to said at least one internal peripheral device.

14. The electronic switchbox of claim 11, further comprising:

a universal serial bus coupled to said selection device; and said selection device selectively coupling said universal serial bus to any one of said plurality of computer connectors.

15. The electronic switchbox of claim 11, further comprising:

a power supply coupled to said at least one internal peripheral device.

16. The electronic switchbox of claim 11, further comprising:

said at least one internal peripheral device further comprising:

at least one first type of internal peripheral device mounted within a corresponding one of said at least one slot; and at least one second type of internal peripheral device mounted within a corresponding one of said at least one slot;

a first peripheral bus coupled to said at least one first type of internal peripheral device;

a second peripheral bus coupled to said at least one second type of internal peripheral device; and said selection device selectively coupling said first and second peripheral buses to any one of said plurality of computer connectors.

17. The electronic switchbox of claim 16, further comprising:

said at least one first type of internal peripheral device and said first peripheral device implemented according to the SCSI standard; and said at least one second type of internal peripheral device and said second peripheral device implemented according to the ATAPI standard.

18. The electronic switchbox of claim 16, further comprising:

a universal serial bus coupled to said selection device; and said selection device further selectively coupling said universal serial bus to any one of said plurality of computer connectors.

19. A computer system, comprising:

a plurality of computers;

a plurality of internal peripheral devices;

an electronic switchbox, comprising:

a chassis including a plurality of slots provided within the chassis, wherein each of said plurality of internal peripheral devices are configured to mount within any one of said plurality of slots;

a peripheral bus coupled to each of said plurality of internal peripheral devices via corresponding slots;

a plurality of computer connectors; and a selection device that selectively couples said peripheral bus to any one of said plurality of computer connectors; and a plurality of computer cables, each coupled between a corresponding one of said plurality of computers and a corresponding one of said plurality of computer connectors.

20. An electronic switchbox that couples at least one internal peripheral device to any one of a plurality of computer systems, comprising:

at least one peripheral connector for receiving and electrically coupling to an internal peripheral device;

a plurality of computer connectors, each for coupling to one of the plurality of computer systems;

a selection device that selectively couples said peripheral connector to any one of said plurality of computer connectors; and share logic coupled to said the at least one peripheral connector that allows simultaneous sharing of said at least one peripheral connector among said plurality of computer connectors.

* * * * *